United States Patent Office 3,823,096
Patented July 9, 1974

---

3,823,096
MODIFIED FLEXIBLE POLYETHERURETHANE FOAMS
Hubert Jakob Fabris, Akron, and Edwin Morgan Maxey, Kent, Ohio, assignors to The General Tire & Rubber Company, Akron, Ohio
No Drawing. Filed Sept. 29, 1972, Ser. No. 293,361
Int. Cl. C08g 22/44
U.S. Cl. 260—2.5 AP                          6 Claims

ABSTRACT OF THE DISCLOSURE

Polyether polyols capped with or containing strongly hydrogen-bonding urethane and/or urea end groups, prepared by reaction of a polyether polyol with an organic monoisocyanate or by sequential reaction first with a polyisocyanate and then with an organic primary monoamine, employed alone or in combination with more primary amine in a flexible polyol-modified polyurethane foam significantly improves the load factor of the polyurethane foam.

BACKGROUND OF THE INVENTION

The incorporation of polyether polyols in place of polyester polyols in flexible polyurethane foam formulations is known to improve the resilience of the resulting foams. However, while the resilience is improved by this method, the foams do not have the load carrying capacity nor the load factor of rubber latex foams.

This invention is based upon the discovery that in flexible polyurethane foam formulation the employment of polyether polyols capped with strongly hydrogen-bonding urethane and/or urea end groups will significantly improve the load carrying characteristics of the foams toward that of rubber latex foams.

SUMMARY OF THE INVENTION

Polyether polyols that are capped with strongly hydrogen-bonding urethane and/or urea end groups are employed in flexible water-blown polyetherurethane foam formulations to improve the load factor of the finished foams toward that of rubber latex foams without raising the density of the polyetherurethane foams. Alternatively, urea end groups can be prepared in situ. Employment of the capped polyols in combination with unhindered organic primary monoamines in the same foam formulations will further improve the load factor significantly. The capped polyether polyols are normally used in amounts from 5% to 25% by weight of the non-capped polyols. The amines, when present, are employed in amounts of from 0.005 to 0.1 gm.-mole per 100 grams of polyol.

The capped polyether polyols are prepared preferably by reacting them with an organic monoisocyanate to convert the hydroxyl groups to urethane groups. Another desirable method of capping is to react sequentially the polyols with an organic polyisocyanate, preferably a diisocyanate, and then with an aromatic or aliphatic primary monoamine, preferably aniline, to convert the isocyanate groups to urea groups.

The principal object of this invention is to provide a means to improve significantly the load factor in a flexible polyurethane foam by employing a polyether polyol that is capped with urethane and/or urea end groups. A further object is to provide a method of altering the viscosity properties of flexible polyurethane foam formulations so as to reduce and, in some cases eliminate the requirement for a stabilizing surfactant therein. These and other objects which are apparent from the following description of the preferred embodiments, the examples and the appended claims are satisfied by this invention.

DESCRIPTION OF THE PREFERRED EMBODIMENTS

This invention involves the use of urethane and/or urea capped polyether polyols in flexible polyurethane foams. The most widely accepted method of making flexible polyurethane foams is to react an organic polyisocyanate with a polyether polyol or other compound containing active hydrogen, i.e., a hydrogen that is active as measured and determined by the Zerewitinoff method JACS, vol. 49, p. 3181 eq. seq. (1927). Optionally, other ingredients may be used such as water, auxiliary blowing agents catalysts and surface active agents.

A wide variety of polyisocyanate compounds can be used in the polyurethane reaction as is well known in the art. The preferred polyisocyanates for this use are the hydrocarbon diisocyanates containing no more than about 30 carbon atoms, more preferably no more than about 15 carbon atoms, such as toluene-2,4- and -2,6-diisocyanates; 1,6-hexamethylenediisocyanate; diphenylmethane-p,p'- or -m,m'-diisocyanates and their polymers; and di-isocyanatomethyl benzene. However, other organic diisocyanates and polyisocyanates can be included or substituted as is well known in the art. It is to be understood that mixtures of two or more di- and/or polyisocyanates can be employed. Aromatic isocyanates are generally preferred, particularly the toluene diisocyanates.

Suitable polyether polyols can be prepared by reacting a polyhydric alcohol, phenol or an amine with an alkylene oxide in the presence of a catalyst. The preferred reactants are polyhydric alcohols such as ethylene glycol, pentaerythritol, propylene glycol, 2,3-butylene glycol 1,3-butylene glycol, 1,5-pentanediol, 1,6-hexanediol, glycerol, trimethylolpropane and mixtures thereof. Suitable alkylene oxides include ethylene oxide, propylene oxide, butylene oxide, amylene oxide, epichlorohydrin and mixtures of these. Other polyether polyols well known in the art can be included or substituted in the systems of this invention regardless of their methods of preparation. Mixtures of such polyols can also be employed.

If desired, a portion of the polyhydric alcohol can be replaced with another compound having at least two reactive hydrogen atoms, such as alkyl amines, alkylene polyamines, cyclic amines, amides and polycarboxylic acids. Suitable alkyl amines and alkylene polyamines include methylamine, ethylamine, propylamine, butylamine, hexylamine, ethylene diamine, 1,6-hexane diamine, diethylene diamine, and the like. Also, cyclic amines such as piperazine, 2-methyl-piperazine and 2,5-dimethyl-piperazine can be used as well as amides such as acetamide, succinamide and benzene sulphonamide and other compounds containing active hydrogens.

Generally, the polyether polyols or polyol mixtures suitable for use in making flexible polyurethane foam herein are liquids or meltable solids having a molecular weight of 500 to about 5000 and having an average functionality of at least about 2 and generally not more than 3.

In the polyurethane reaction the isocyanate reacts with the polyol and water in the presence of a catalyst wherein the polyol reacts with some of the isocyanate to form a chain extended polyurethane, more of the isocyanate reacts with the water to form carbamic acid that breaks down to form a primary amine and carbon dioxide, the carbon dioxide expands the polyurethane into a cellular structure of foam, and the primary amine formed from the gas reaction reacts with further isocyanate to form a di-substituted urea which in turn may react with more isocyanate to form cross-linking biuret structures.

Generally, water in an amount of 1 to about 5 parts by weight per 100 parts of unmodified polyether polyol is added to the formulation to help produce carbon dioxide which forms the pneumatogen to develop the foam structure. The water should be treated to remove impurities such as iron, calcium salts and other materials that produce hardness. Generally speaking, the water should be subjected to treatment with various zeolites and other molecular sieves or distilled to remove virtually all of the impurities.

Catalysts are generally added in amounts of from 0.1 to 5 parts by weight per 100 parts of unmodified polyether polyol to accelerate the different reactions. The chain extension reaction, where the polyol and water react with the isocyanate to produce the polyurethane, is accelerated by tertiary amines and certain metal compounds. In particular, combinations of tertiary amines and tin compounds are used. Examples of tertiary amines include triethylene diamine, tetramethyl butanediamine, β,β'-dimethylaminoethyl ether, triethylamine, N-methylmorpholine, N-ethyl-morpholine, diethylethanolamine, N-coco-morpholine, 1 - methyl - 4 - dimethylaminoethylpiperazine, 3-methoxy-N-dimethylpropyl amine, N,N-dimethyl-N-isopropyl amine, N,N-diethyl-3-diethylaminopropyl amine and dimethyl benzyl amine. Examples of tin catalysts include dibutyl tin dilaurate, stannous chloride, dibutyl tin-di-2-ethylhexoate, stannous octoate, stannous oleate, tetramethyl tin, tetra-n-butyl tin, di-n-butyl tin dichloride, di-isobutyl tin bis(monobutyl maleate), di-n-butyl tin diacetate, di-2-ethylhexyl tin bis(2-ethylhexoate), tri-n-butyl tin acetate and dibutyl tin distearate.

Auxiliary blowing agents or pneumatogens can be used to supplement the blowing action from the water reaction. Examples of useable pneumatogens include halogenated hydrocarbons such as monofluorotrichloromethane, dichlorodifluoromethane, trifluoromonochlormethane, 1,1, 2-trichloro - 1,2,2 - trifluoroethane, dichlorotetrafluoroethane, ethylene chloride, methylene chloride, chloroform and carbon tetrachloride. Other useful foaming agents include lower molecular weight alkanes, such as methane, ethane, propane, pentane, hexane and heptane; alkenes such as ethylene and propylene; ethers such as ethyl ether and diisopropylether; mixtures thereof and the like. Generally, the halogenated hydrocarbons are employed in an amount from about 1 to 50 parts by weight per 100 parts by weight of the unmodified polyol.

A surfactant is normally added in the range of 0.1 to 5 parts by weight per 100 parts of unmodified polyol to improve the cell structure and prevent collapsing of the foam during expansion of the pneumatogen. Typical surfactants are siloxane oxyalkylene block copolymers such as those disclosed in U.S. Pat. No. 2,834,748.

The modified polyether polyols which are employed in this invention and which contain strongly hydrogen-bonding urethane and/or urea end groups are preferably prepared by either capping the polyol with a stoichiometric equivalent of an organic monoisocyanate to place urethane end groups on the polyol or by sequentially reacting the polyol with a mol of organic diisocyanate (such as described above) per mol of hydroxyl in the polyol and then a stoichiometric equivalent (based on isocyanate groups) of an organic monoamine such as aniline to place urea end groups on the polyol. The polyols to be modified or capped have an average hydroxyl functionality of at least about 2 and generally not more than 3 and an equivalent weight based on the hydroxyl functionality in the range of 200 to 2000.

The organic monoisocyanate is preferably an aliphatic or aromatic hydrocarbon of up to about 18 carbon atoms, free of aliphatic unsaturation and containing one isocyanate group. The organic monoisocyanate is also preferably soluble in the polyol to be modified and more preferably a liquid. Examples of preferred organic monoisocyanates include ethyl isocyanate, iso-butyl isocyanate, hendecyl isocyanate, alpha-naphthyl isocyanate, phenyl isocyanate and the o-, m- and p-tolyl isocyanates.

The organic monoamine is preferably an aliphatic or aromatic hydrocarbon of up to about 18 carbon atoms, free of aliphatic unsaturation and containing one primary amine group. The organic monoamine is also preferably soluble in the polyol being modified and more preferably a liquid. Examples of preferred organic monoamines include benzyl amine, aniline, n-propylamine, 1-amino-3-methyl-butane, n-hexylamine, o-, m- and p-toluidine and alpha- and beta-naphthylamines.

The capped or modified polyols can be employed either alone or in combinations. By varying the choice of polyol and its molecular weight and functionality, the choice of polyisocyanate, and the choice of primary amine or other active hydrogen-containing compound for final capping, one may vary the effect of the capped urea.

These capped polyether polyols can be employed in amounts ranging from 5 to 25 parts by weight per 100 parts by weight of the uncapped polyol.

A further embodiment of this invention is the use of the capped polyether polyols described above in combination with organic primary monoamines in flexible polyurethane foam formulations. Such a combination produces a marked increase in load factor of the foam over and above that achieved by the sole use of the capped polyether polyol. A wide variety of primary amines are suitable for use in combination with the capped polyether polyols. Examples of such primary amines are as set forth above. These primary amines, when present, can be utilized in amounts ranging from about 0.005 to 0.1 gram-mole per 100 grams of the capped polyether polyol.

In addition to the increase in the load factor of flexible polyurethane foams utilizing capped polyether polyols, the flexible polyurethane foams also exhibit a compression load curve having much less pronounced plateaus than found in similar urethane foams not containing the additives disclosed herein. These plateaus are characteristic of flexible polyurethane foams but they do not appear in rubber latex foams. This particular property is highlighted in the embodiment wherein the capped polyether polyol is used in combination with a primary amine.

A further unobvious result of the use of capped polyether polyols in flexible polyurethane foam formulations is a marked change in the viscosity profile of the formulation prior to foaming. Whereas, the unmodified polyether polyols alone exist as viscous syrups, addition of the capped polyether polyols to the unmodified polyether polyols, with or without the primary amine, results in a marked increase in viscosity to the extent that the resulting mixture takes on a gelatinous appearance. However, upon brief stirring, the gel character of the formulation disappears, and it reverts to a conventional viscous syrup condition. This transition is reversible. This thixotropic character is believed to lend a significant degree of stabilization to the formulation during development of the foam and may be responsible for the noticeable decrease in the requirement for stabilizing surfactants in formulations utilizing the capped polyether polyols. A similar viscosity effect is obtained if urea groups are formed in situ by addition of small amounts of highly-reactive primary monoamines to the formulation. These amines are preferably dissolved in the polyol component. Particularly pronounced improvements in load factor have been obtained with combination of the two techniques.

The following examples are illustrative of the best presently known means for practicing this invention and are not intended to limit this invention the scope of which is delineated in the appended claims. Unless otherwise noted, all parts are by weight and all percentages are by weight.

EXAMPLE I

A capped polyether polyol was prepared by reacting a polyoxypropylene triol with ethylene oxide and a suitable catalyst until all hydroxyls were fully capped. The reaction product having a molecular weight of about 4600 (an equivalent weight of about 1500) was isolated and then reacted with a stoichiometric amount of phenyl isocyanate to convert the hydroxyls to urethane groups.

Two samples of water-blown flexible polyetherurethane foam were made from the ingredients listed below. All ingredients were blended together in a high shear mixer and the formulation poured into a cardboard dairy container to form a foam in air at room temperature. The samples were then oven cured for 10 minutes at 260° F. and subjected to a series of tests the values of which are also shown below:

| Sample | A | B |
|---|---|---|
| Ingredients: | | |
| Polyoxypropylene triol, 3,000 mol wt | 100 | 100 |
| Capped polyether polyol | | 10 |
| 80/20:2,4/2,6 toluene diisocyanate | 52 | 52 |
| Water | 4 | 4 |
| Silicone surfactant | 1 | 1 |
| Stannous octoate | 0.35 | 0.35 |
| N,N,N′,tetramethyl butane diamine | 0.05 | 0.05 |
| N-methyl morpholine | 0.60 | 0.60 |
| Properties: | | |
| Density, lbs./ft.³ (4" x 4" x 2" sample) | 1.59 | 1.62 |
| 25% compression deflection load, lbs | 5.9 | 6.0 |
| 65% compression deflection load, lbs | 12.0 | 13.8 |
| Load factor | 2.04 | 2.31 |
| Schopper rebound | 52 | 56 |

The improvement in Load Factor when employing the capped polyol is significant.

EXAMPLE II

A capped polyether polyol was prepared by reacting a 2000 molecular weight polyoxypropylene diol with twice its equivalent weight of an 80/20 mixture of 2,4/2,6-toluene diisocyanate. The reaction product was thereafter reacted with sufficient aniline to convert all of the unreacted isocyanate groups to N-phenylurea groups. This product was blended with an equal weight of 3000 molecular weight polyoxypropylene triol for ease in handling.

Two samples of water-blown flexible polyetherurethane foam were made from the ingredients listed below. Blending and processing were identical to Example I. At rest the formulation before foaming became highly viscous; during stirring the formulation thinned out significantly but became high viscous when stirring was stopped. This thixotropic behavior may help to stabilize the foaming mixture and reduce or eliminate the requirement for a stabilizing surfactant.

| Sample | A | B |
|---|---|---|
| Ingredients: | | |
| Polyoxypropylene triol, 3,000 mol wt | 90 | 100 |
| 50 wt. percent solution of the capped polyether polyol in 3,000 mol. wt. polyoxypropylene triol | 20 | |
| 80/20:2,4/2,6 toluene diisocyanate | 56 | 56 |
| Water | 4 | 4 |
| Silicone surfactant | 1 | 1 |
| Stannous octoate | 0.50 | 0.50 |
| N,N,N′,N′-tetramethyl butane diamine | 0.05 | 0.05 |
| N-methyl morpholine | 0.60 | 0.60 |
| Properties: | | |
| Density, lbs./ft.³ (4" x 4" x 2" sample) | 1.61 | 1.57 |
| 25% compression deflection load, lbs | 3.8 | 6.5 |
| 65% compression deflection load, lbs | 12.2 | 12.4 |
| Load factor | 3.21 | 1.91 |
| Schopper rebound | 56 | 52 |

The improvement in Load Factor is very marked when employing the capped polyol.

EXAMPLE III

The capped polyether polyol of Example II was used with other ingredients in preparing samples of water-blown flexible polyetherurethane foam as shown in the following table. Blending and processing were identical to Example I.

| Sample | A | B | C | D |
|---|---|---|---|---|
| Ingredients: | | | | |
| Polyoxypropylene triol, 3,000 mol. wt | 100 | 100 | 90 | 90 |
| 50 wt. percent solution of the capped polyether polyol in 3,000 mol. wt. polyplypropylene triol | | | 20 | 20 |
| Aniline | | 2 | | 2 |
| 80/20:2,4/2,6 toluene diisocyanate | 52 | 55 | 52 | 55 |
| Water | 4 | 4 | 4 | 4 |
| Silicone surfactant | 1 | 1 | 1 | 1 |
| Stannous octoate | 0.50 | 0.50 | 0.50 | 0.50 |
| N-methyl morpholine | 0.60 | 0.60 | 0.60 | 0.60 |
| N,N,N′,N′-tetramethyl butane diamine | 0.05 | 0.05 | 0.05 | 0.05 |
| Properties: | | | | |
| Density, lb./ft.³ (4" x 4" x 2" sample) | 1.50 | 1.55 | 1.58 | 1.59 |
| 25% compression deflection load, lbs | 5.6 | 6.6 | 4.3 | 3.0 |
| 65% compression deflection load, lbs | 11.1 | 17.9 | 11.7 | 14.9 |
| Load Factor | 1.98 | 2.71 | 2.72 | 4.97 |
| Schopper rebound | 52 | 48 | 54 | 58 |

The improvement in Load Factor between samples A and C and between A, C and D shows the significant difference in resultant properties between employing capped polyether polyols per se and in combination with a primary amine.

We claim:

1. In the method of preparing a flexible water-blown polyetherurethane foam from a foam formulation comprising organic polyisocyanate, polyether polyol, water, catalyst and any auxiliary blowing agent and surfactant, the improvement consisting essentially of including in said foam formulation a polyether polyol which has been previously fully endblocked with urethane and/or urea groups, said fully endblocked polyether polyol having, prior to being endblocked, an average hydroxyl functionality of at least about 2 and not more than about 3 and an equivalent weight based on said hydroxyl functionality in the range of 200 to 2000, said fully endblocked polyether polyol being present in an amount from 5 to 25 parts by weight per 100 parts by weight of unmodified polyether polyol in said foam formulation, said fully endblocked polyether polyol and said unmodified polyether polyol being substantially all the polyethers employed in said foam formulation.

2. The method of claim 1 fully the endblocked polyether polyol is prepared by reaction of said polyol with a stoichiometric equivalent of an organic monoisocyanate consisting essentially of an aliphatic or aromatic hydrocarbon of up to 18 carbon atoms, free of aliphatic unsaturation and containing one isocyanate group.

3. The method of claim 1 fully the endblocked polyether polyol is prepared by reaction of said polyol with an organic diisocyanate in an amount of one mol of organic diisocyanate per mol of hydroxyl in said polyol followed by reaction of the resulting isocyanate-endblocked polyether with a stoichiometric equivalent of an organic monoamine consisting essentially of an aliphatic or aromatic hydrocarbon of up to 18 carbon atoms, free of aliphatic unsaturation and containing one primary amino group.

4. The method in accordance with claim 1 wherein an organic primary amine is included with said fully endblocked polyether polyol in said foam formulation, said organic primary amine consisting essentially of an aliphatic or aromatic hydrocarbon of up to 18 carbon atoms, free of aliphatic unsaturation and containing one primary amine group, said organic primary amine being present in an amonut from about 0.005 to 0.1 gram-mole per 100 grams of said endblocked polyether polyol.

5. A flexible water-blown polyetherurethane foam containing a polyether polyol which has been previously fully endblocked with urethane and/or urea groups, said fully endblocked polyether polyol having, prior to being endblocked, an average hydroxyl functionality of at least about 2 and not more than about 3 and an equivalent weight based on said hydroxyl functionality in the range of 200 to 2000, said fully endblocked polyether polyol being present in an amount from 5 to 25 parts by weight per 100 parts by weight of unmodified polyether polyol in said foam formulation, said fully endblocked polyether polyol and said unmodified polyether polyol being substantially all the polyethers employed in said foam formulation.

6. A foam in accordance with claim 5 wherein an organic primary amine is included with said fully endblocked polyether polyol in said foam formulation, said organic primary amine consisting essentially of an aliphatic or aromatic hydrocarbon of up to 18 carbon atoms, free of aliphatic unsaturation and containing one primary amine group, said organic primary amine being present in an amount from about 0.005 to 0.1 gram-mole per 100 grams of said endblocked polyether polyol.

References Cited

UNITED STATES PATENTS 3,595,814   7/1971   Lloyd _____ 260—2.5 AM

FOREIGN PATENTS 2,000,063   8/1969   France.
1,250,401   10/1971  Great Britain.

DONALD E. CZAJA, Primary Examiner

C. W. IVY, Assistant Examiner

U.S. Cl. X.R.

252—182; 260—2.5 AM

UNITED STATES PATENT OFFICE
CERTIFICATE OF CORRECTION

PO-1050
(5/69)

Patent No. 3,823,096     Dated July 9, 1974

Inventor(s) Hubert Jakob Fabris and Edwin Morgan Maxey

It is certified that error appears in the above-identified patent and that said Letters Patent are hereby corrected as shown below:

Column 1, line 32, which reads: "formulation" should read ---formulations---.

Column 2, line 10, which reads: "eq." should read ---et.---.

Column 2, line 14, which reads: "polyuret hane" should read ---polyurethane---.

Column 2, line 31, which reads: "2,3-butylene glycol 1,3-butylene" should read ---2,3-butylene glycol, 1,3-butylene---.

Column 4, line 61, which reads: "combination" should read ---combinations---.

Column 5, Example II, Under Column A, which reads: ".20" should read ---20---.

Column 6, 5th & 6th lines of Table, (2nd Ingredient) which reads: "polyplypropylene" should read ---polyoxypropylene---.

Column 6, line 42, delete "fully the" and add ---wherein the fully---.

Column 6, line 48, delete "fully the" and add ---wherein the fully---.

PO-1050
(5/69)

UNITED STATES PATENT OFFICE
CERTIFICATE OF CORRECTION

Patent No. 3,823,096          Dated  July 9, 1974

Inventor(s)  Hubert Jakob Fabris and Edwin Morgan Maxey

It is certified that error appears in the above-identified patent and that said Letters Patent are hereby corrected as shown below:

Column 6, line 57, which reads: "amino" should read ---amine---.

Column 6, line 65, which reads: "amonut" should read ---amount---.

Signed and sealed this 3rd day of December 1974.

(SEAL)
Attest:

McCOY M. GIBSON JR.
Attesting Officer

C. MARSHALL DANN
Commissioner of Patents